United States Patent
Huang et al.

(10) Patent No.: US 7,499,497 B2
(45) Date of Patent: Mar. 3, 2009

(54) IMPULSE SUPPRESSION APPARATUS APPLIED IN OFDM SYSTEM AND RELATED METHOD THEREOF

(75) Inventors: Jun-Jue Huang, Taipei County (TW); York-Ted Su, Chiayi (TW)

(73) Assignee: MediaTek Inc., Hsin-Chu Hsien (TW)

( * ) Notice: Subject to any disclaimer, the term of this patent is extended or adjusted under 35 U.S.C. 154(b) by 582 days.

(21) Appl. No.: 11/164,884

(22) Filed: Dec. 8, 2005

(65) Prior Publication Data
US 2006/0198453 A1 Sep. 7, 2006

(30) Foreign Application Priority Data
Dec. 15, 2004 (TW) .............................. 93138953 A (51) Int. Cl.
*H04K 1/10* (2006.01)

(52) U.S. Cl. ...................................... 375/260

(58) Field of Classification Search ............... 375/219, 375/229–236, 142, 143, 144, 148, 150, 152, 375/316, 343, 346, 260; 333/18, 28 R; 708/300, 708/322, 323; 379/340, 398; 455/63.1, 114.2, 455/278.1, 296

See application file for complete search history.

(56) References Cited

U.S. PATENT DOCUMENTS

| | | | | |
|---|---|---|---|---|
| 7,302,240 | B2 * | 11/2007 | Koga et al. | 455/130 |
| 2003/0210749 | A1 * | 11/2003 | Asjadi | 375/260 |
| 2004/0005022 | A1 * | 1/2004 | Zhu et al. | 375/365 |

OTHER PUBLICATIONS

Abdelkefi et al. A necessary condition on the location of pilot tones for impulse noise cancellation in OFDM system and its applications in Hiperlan2, Globecom 2003, p. 883-887.*
Maja Sliskovic., "Signal Processing Algorithm for OFDM Channel With Impulse Noise.", pp. 222-225.
Dukhyun Kim & Gordon L. Stuber., "Clipping Noise Mitigation for OFDM by Decision-Aided Reconstruction.", IEEE Communications Letter, Jan. 1999, pp. 4-6, vol. 3, No. 1.
T.N. Zogakis, P.S. Chow, J.T. Aslanis, and J.M. Cioffi., "Impulse Noise Mitigation Strategies for Multicarrier Modulation,", pp. 784-788, 1993IEEE.

* cited by examiner

*Primary Examiner*—Sam K Ahn
(74) *Attorney, Agent, or Firm*—Winston Hsu (57) ABSTRACT

An impulse suppression apparatus and method applied in an OFDM system for suppressing the impulse noise of a first time-domain signal are disclosed. The impulse suppression apparatus includes a noise blanker for generating a second time-domain signal through blanking the noise of the first time-domain signal, wherein each absolute value of the second time-domain signal is not greater than a predetermined value, a first Fourier transform unit for performing a Fourier transform on the second time-domain signal to generate a frequency-domain signal, an equalizing module for generating an equalized signal by equalizing each sub-carrier signal of the frequency-domain signal, a decision unit for generating a decision signal according to the equalized signal, and a compensation module for computing the difference between the equalized signal and the decision signal and for generating the output signal through calibrating the equalized signal according to the difference.

22 Claims, 4 Drawing Sheets

IMPULSE SUPPRESSION APPARATUS APPLIED IN OFDM SYSTEM AND RELATED METHOD THEREOF

BACKGROUND

The invention relates to an impulse suppression apparatus and a related method, and more particularly, to an impulse suppression apparatus and a related method utilizing a decision-aided reconstruction procedure.

Generally, the radio frequency communication systems suffer more interferences, such as atmospheric interference and jamming, than the wired transmission communication systems. Some interferences appear as Gaussian model, and some interferences generated by electrical self-starters, power lines, or high-current switches, are called impulse noises. Since the impulse, the short for impulse noise, contains a lot of power in a short time interval, the influence of the impulse on a received signal is greater than other kinds of noise on the received signal. As a result, it is an important issue to receivers to detect and suppress the impulse noises.

Figure 1:
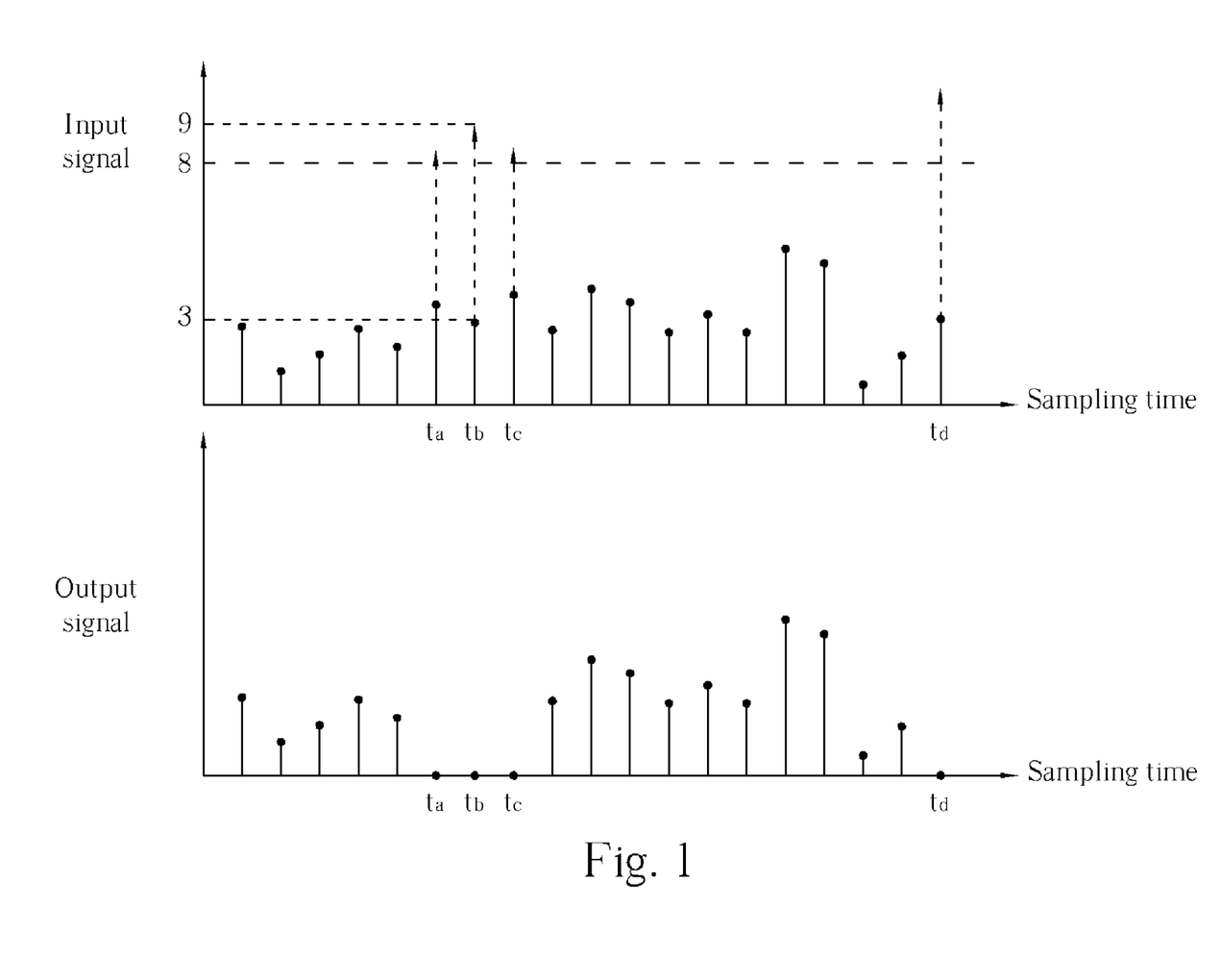
FIG. 1 is a schematic diagram of the operation of a related art impulse suppressing method.

Take the radio frequency communication systems for transmitting audio and video data as an example, such as a Digital Video Broadcasting-Terrestrial (DVB-T) system. Since the impulse contains high power, the audio-output equipments suffering the impulse may generate a popping noise, and the image output equipment suffering the impulse may show a distorted image on its screen. It goes without saying that the popping noise and distorted image make the end users feel uncomfortable. Therefore, when designing the DVB-T system, the system designer would rather sacrifice some signal quality to suppress the impulse than hope the end users being tolerant on the popping noise and the distorted image. A common method for suppressing impulse noise is comparing the absolute value of the receive signal with a threshold value. If the absolute value of the receive signal is greater than the threshold value at a time point, the system determines the received signal is influenced by an impulse at the time point and sets the value of the received signal at the time point to be zero. Please refer to FIG. 1. FIG. 1 is a schematic diagram of the operation of a related art impulse suppressing method. As shown in FIG. 1, the input signal is a digital signal, and corresponds to different values at different sampling time, where the absolute value of the input signal represents the magnitude of the input signal at a sampling time. The solid line denotes the actual magnitude of the input signal, and the dotted line represents the magnitude of an impulse noise. At the sampling time $t_b$, the magnitude of the input signal is "3", and the input signal suffers the impulse noise, whose magnitude is "6". Therefore the detected magnitude of the input signal at the sampling time $t_b$ is "9". If the threshold value mentioned above is "8", the receiver determines the input signal is influenced by an impulse noise at sampling time $t_b$, and sets the value of output signal at the sampling time $t_b$ to be "0". In the same manner, the receiver also sets the values of the output signal at the sampling time $t_a$, $t_c$, $t_d$ to be zero. Although the impulse noises at the sampling time $t_a$, $t_b$, $t_c$, $t_d$ are suppressed, the actual value of the input signal at the sampling time $t_a$, $t_b$, $t_c$, $t_d$ are suppressed too. For example, at the sampling time $t_b$, the magnitude of the impulse noise is "6", and the actual magnitude of the input signal is "3". As the value of the output signal is set to be zero, both of the magnitude of the impulse noise and the magnitude of the input signal are suppressed. As a result, the procedure mentioned above distorts the data transmitted via the input signal.

In some application, the users will not be aware the distortion because of the limitation of human sense organs. For example, regarding the image transmission system, the audience will not be aware the difference of a pixel. Hence, if the input signal is distorted at a few sampling times the audience will not be aware. This phenomenon also happens in audio data transmission system. However, as the quality of the audio and video equipments raise, required quality of image and sound increases. In summary, although the related art method can suppress the impulse noise obviously, the quality of the received signal is reduced accordingly. As a result, the related art method cannot present the transmitted audio and video data correctly.

SUMMARY

It is therefore an objective of the claimed invention to provide an impulse suppression apparatus and the related method utilizing a decision-aided reconstruction procedure to solve the above-mentioned problem.

According to the claimed invention, an impulse noise suppression apparatus applied in an Orthogonal Frequency Division Multiplexing (OFDM) communication system for suppressing an impulse noise in a first time-domain signal to generate an output signal is disclosed. The first time-domain signal is an OFDM time-domain signal. An OFDM frequency-domain signal can be generated by performing a Fourier transform on the OFDM time-domain signal, and is composed of a plurality of sub-carrier signals. The impulse suppression apparatus comprises: a noise blanker for blanking the impulse noise of the first time-domain signal to generate a second time-domain signal, wherein if at a time point the absolute value of the first time-domain signal is greater than a first threshold value, the noise blanker generates the second time-domain signal having an absolute value not greater than a predetermined value at the time point; and if the absolute value of the first time-domain signal is not greater than the first threshold value at a time point, the noise blanker generates the second time-domain signal according to the value of the first time-domain signal; a first Fourier transform unit, coupled to the noise blanker, for performing a Fourier transform on the second time-domain signal to generate a frequency-domain signal; an equalizing module, coupled to the first Fourier transform unit, for generating an equalized signal by equalizing a plurality of sub-carrier signals of the frequency-domain signal according to a plurality of channel estimation values corresponding to a plurality of sub-carrier channels of the OFDM communication system, wherein the equalized signal is composed of a plurality of equalized values, and each equalized value corresponds to a sub-carrier; a decision unit, coupled to the equalizing module, for generating a decision signal according to the equalized signal, wherein the decision signal is composed of a plurality of decision values and each decision value corresponds to a sub-carrier; and a compensation module, coupled to the equalizing module and the decision unit, for estimating a time-domain compensation signal corresponding to the difference between the equalized signal and the decision signal, and for generating the output signal by calibrating the equalized signal according to a frequency-domain compensation signal corresponding to the time-domain compensation signal, wherein the output signal is composed of a plurality of output values and each output value corresponds to a sub-carrier.

According to the claimed invention, an impulse noise suppression method applied in an Orthogonal Frequency Division Multiplexing (OFDM) communication system for suppressing an impulse noise in a first time-domain signal to generate an output signal is disclosed. The first time-domain signal is an OFDM time-domain signal, and an OFDM frequency-domain signal can be generated by transforming the OFDM time-domain signal and is composed of a plurality of sub-carrier signals. The impulse suppression method comprises: (a) if the absolute value of the first time-domain signal is greater than a first threshold value at a time point, generating the second time-domain signal having a absolute value not greater than a predetermined value; and if the absolute value of the first time-domain signal is not greater than a first threshold value at a time point, generating the second time-domain signal according to the value of the first time-domain signal; (b) performing a Fourier transform on the second time-domain signal to generate a frequency-domain signal; (c) generating an equalized signal by equalizing a plurality of sub-carrier signals of the frequency-domain signal according to a plurality of channel estimation values corresponding to a plurality of sub-carrier channels of the OFDM communication system, wherein the equalized signal is composed of a plurality of equalized values, and each equalized value corresponds to a sub-carrier; (d) generating a decision signal according to the equalized signal, wherein the decision signal is composed of a plurality of decision values and each decision value corresponds to a sub-carrier; and (e) estimating a time-domain compensation signal corresponding to the difference between the equalized signal and the decision signal, then generating the output signal by calibrating the equalized signal according to a frequency-domain compensation signal corresponding to the time-domain compensation signal, wherein the output signal is composed of a plurality of output values and each output value corresponds to a sub-carrier.

According to the present invention, the impulse suppression apparatus and the related method utilize a compensation module to compute a frequency-domain compensation signal. The frequency-domain compensation signal calibrates an equalized signal to generate the output signal (i.e., a decision-aided reconstruction signal). Therefore the impulse suppression apparatus and the related method let the output signal, which corresponds to the frequency-domain signal of the first time-domain signal, is less influenced by the impulse noise according to the present invention. In addition, the impulse suppression apparatus and the related method are capable of improving the quality of the channel estimation values of an OFDM system. As a result, the signal quality of the OFDM is improved significantly through utilizing the improved channel estimation values.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
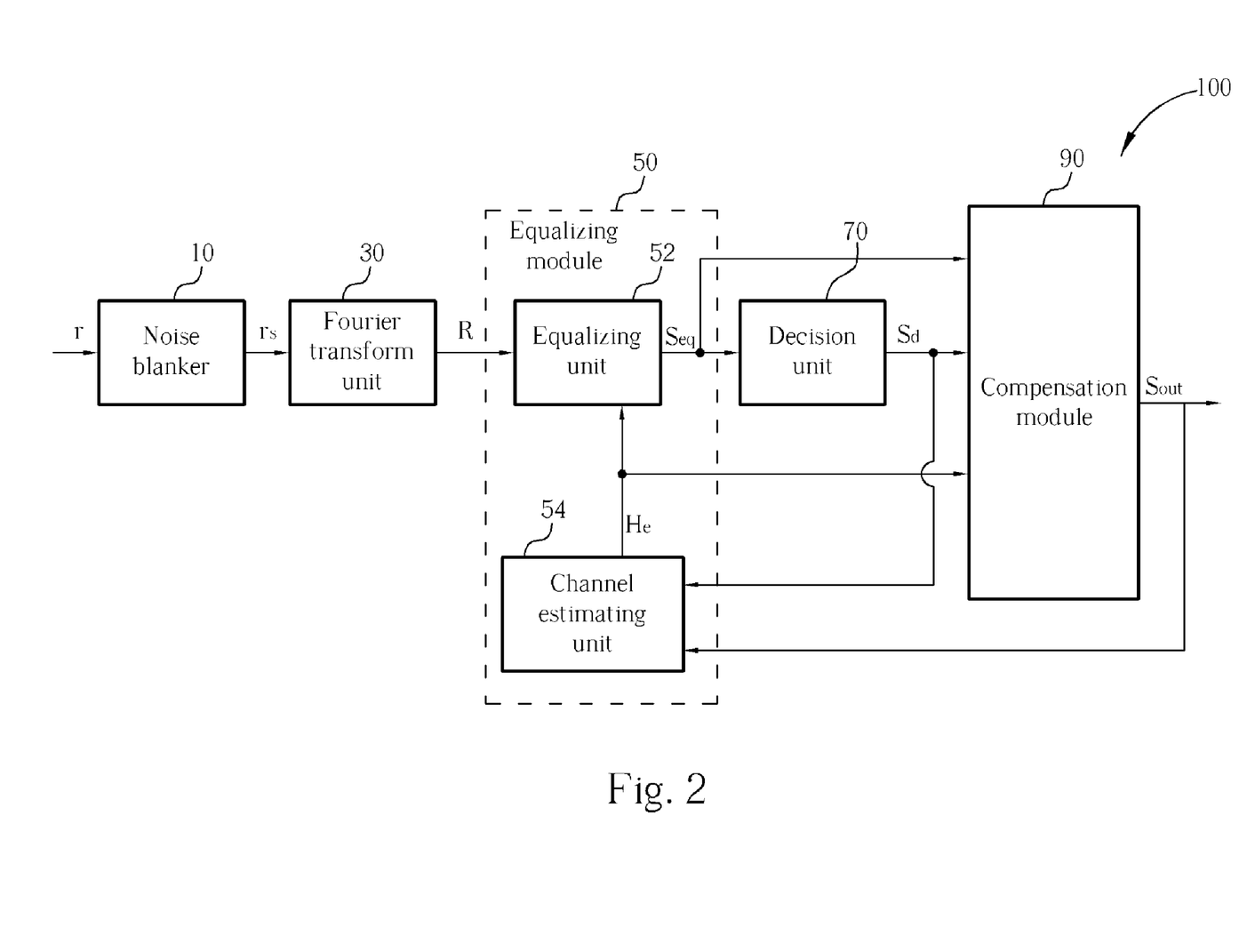
FIG. 2 is a functional block diagram of the impulse suppression apparatus according to an embodiment of the present invention.

Please refer to FIG. 2. FIG. 2 is a functional block diagram of the impulse suppression apparatus 100 according to an embodiment of the present invention. The impulse suppression apparatus 100 is utilized to suppress the impulse noise in a received signal of the Orthogonal Frequency Division Multiplexing (OFDM) communication system by blanking the received signal while an impulse noise is detected. The impulse suppression apparatus 100 further estimates the distorted portion in the received signal due to the impulse noise blanking and compensates the received signal with the estimation of the distorted portion to generate a decision-aided reconstruction signal. As shown in FIG. 2, the impulse suppression apparatus 100 comprises a noise blanker 10, a Fourier transform unit 30, an equalizing module 50, a decision unit 70, and a compensation module 90 according to the present embodiment. The noise blanker 10 blanks the impulse noise in a received time-domain signal r to generate a time-domain signal $r_s$ by comparing the magnitude of the time-domain signal r with a threshold value $V_{TH}$ at each sampling time point. When the magnitude of the time-domain signal r is greater than the threshold value $V_{TH}$ at a specific sampling time point, the noise blanker 10 sets the value of the time-domain signal $r_s$ to be zero at that time point; otherwise, the noise blanker 10 sets the value of the time-domain signal $r_s$ according to the value of the time-domain signal r at that time point. The operation of the noise blanker 10 is represented as the following equation:

$$r_s[i] = \begin{cases} 0, & \text{if } |r[i]| > V_{TH} \\ r[i], & \text{otherwise} \end{cases} \qquad \text{Equation (1)}$$

In Equation (1), r[i] denotes the value of the time-domain signal at the i-th sampling time point, and |r[i]| denotes the absolute value of the time-domain signal r at the i-th sampling time point (i.e., the magnitude of the time-domain signal r at the i-th sampling time point).

The Fourier transform unit 30 generates a frequency-domain signal R by performing a Fourier transform on the time-domain signal $r_s$ according to the sub-carrier frequencies of the OFDM system. Since the OFDM system adopts a plurality of (say, N) sub-carriers to carry information, each frequency-domain signal R comprises N sub-carrier signals. The equalizing module 50 includes an equalizing unit 52 and a channel estimating unit 54. The channel estimating unit 54 evaluates the channel estimation value $H_e$ for each sub-carrier. The equalizing unit 52 generates a equalized signal $S_{eq}$ by equalizing each sub-carrier signal of the frequency-domain signal R according to the corresponding channel estimation value $H_e$, where the equalized signal $S_{eq}$ comprises N equalized values, each respectively corresponds to a sub-carrier. The equalization mitigates the channel effect within the received signal, wherein the channel effect is occurred during the signal transmission through the communication channel, to restore the signal characteristics as it being originally transmitted. The decision unit 70 performs a hard-decision on the equalized signal $S_{eq}$ output by the equalizing module 50 to generate a decision signal $S_d$. In the same manner, the decision signal $S_d$ comprises N decision values each respectively corresponding to a sub-carrier. It should be noted that some sub-carrier channels of the OFDM system are designated as pilot channels for transmitting pilot symbols, where the values of the pilot symbols are assigned as known values. Consequently, if the decision unit 70 receives an equalized value corresponding to the pilot symbols, the decision unit 70 directly sets the known value of the pilot symbol as the decision results of the pilot symbol instead of performing the hard-decision procedure. The compensation module 90 evaluates a frequency-domain compensation signal $S_c$ according to the equalized signal $S_{eq}$, the decision signal $S_d$, and N channel estimation values $H_e$ respectively corresponding to the sub-carrier channels, then compensates the equalized signal $S_{eq}$ according to the frequency-domain compensation signal $S_c$ to generate an output signal $S_{out}$ which serves as the decision-aided reconstruction signal. The operation of the compensation module 90 is detailed in the following paragraph.

Figure 3:
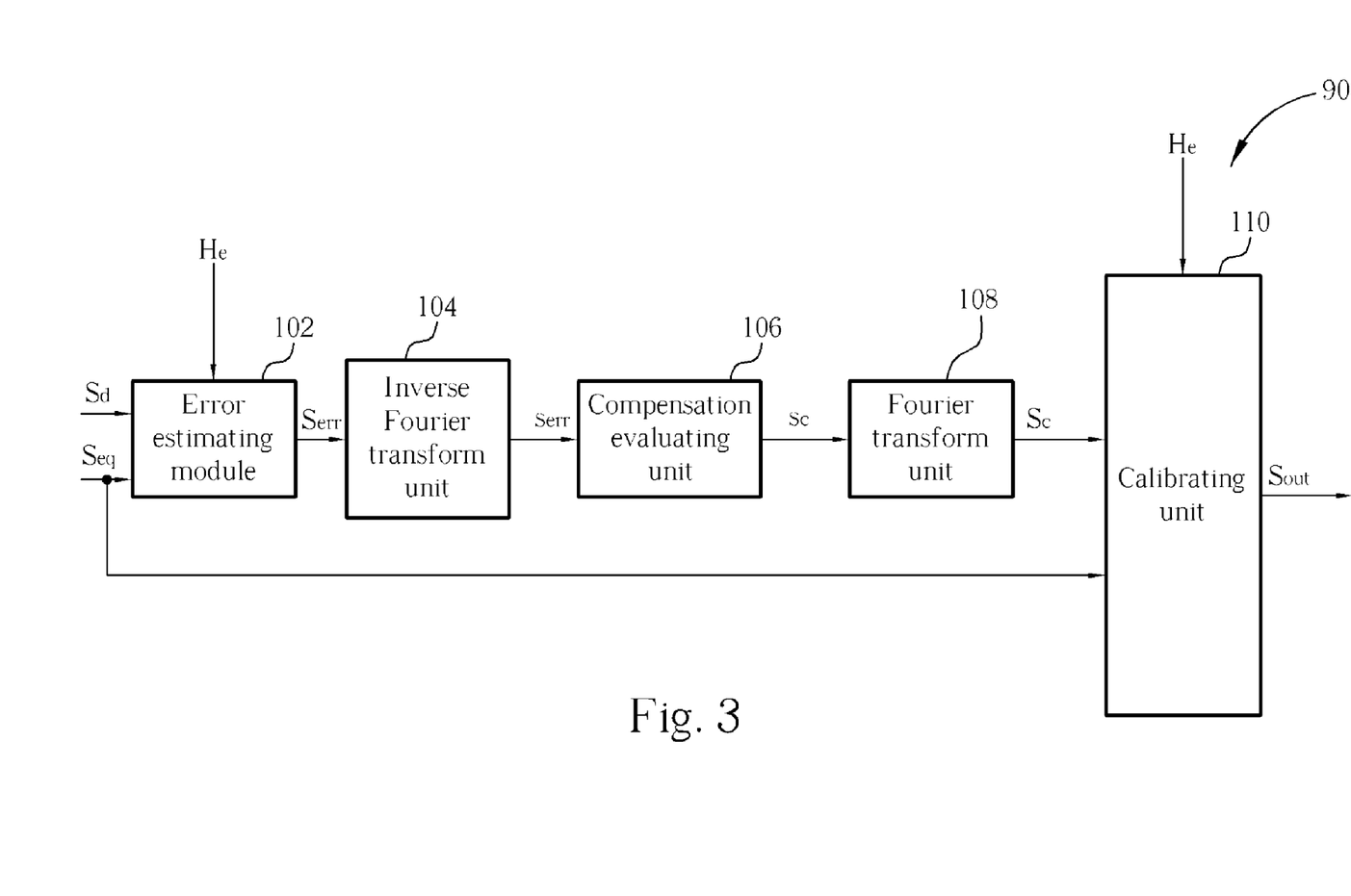
FIG. 3 is a functional block diagram of the compensation module shown in FIG. 2.

Please refer to FIG. 3. FIG. 3 is a functional block diagram of the compensation module 90 shown in FIG. 2. As shown in FIG. 3, the compensation module 90 includes an error estimating module 102, an inverse Fourier transform unit 104, a compensation estimating unit 106, a Fourier transform unit 108, and a calibrating unit 110. In the beginning, the error estimating module 102 estimates the difference between the equalized signal $S_{eq}$ and the decision signal $S_d$, then multiplies the estimated difference with the channel estimation values $H_e$ to generate a frequency-domain error signal $S_{err}$. The operation of the error estimating module 102 is represented by the following equation:

$$S_{err}[m] = (S_{eq}[m] - S_d[m]) \cdot H_e[m], m=1,2,\ldots,N \quad \text{Equation (2)}$$

wherein the index m denotes the m-th sub-carrier.

The error estimating module 102 is utilized to generate a frequency-domain error signal $S_{err}$ by estimating the difference between the equalized signal $S_{eq}$ and the decision signal $S_d$ then multiplying the difference between the equalized signal $S_{eq}$ and the decision signal $S_d$ by the channel estimation values $H_e$. Next, the inverse Fourier transform unit 104 performs an inverse Fourier transform on the frequency-domain error signal $S_{err}$ to generate a time-domain error signal $s_{err}$. The time-domain signal characteristic of the error signal $s_{err}$ facilitates the evaluation of the distortion portion of the time-domain signal r caused by the noise blanker 10 during the impulse noise blanking. To evaluate the distorted portion caused by noise blanker 10, the compensation evaluating unit 106 masks the time-domain error signal $s_{err}$ according to a threshold value $V_{TH2}$ to generate a time-domain compensation signal $s_c$ accordingly. The compensation estimating unit 106 compares the magnitude of the time-domain error signal $s_{err}$ at each sampling time point with the threshold value $V_{TH2}$. If the absolute value of the time-domain error signal $s_{err}$ is greater than the threshold value $V_{TH2}$, the compensation estimating unit 106 assigns the value of the time-domain compensation signal $s_c$ at the time points as the value of the time-domain error signal $s_{err}$, if the absolute value of the time-domain error signal $s_{err}$ is not greater than the threshold value $V_{TH2}$, the compensation estimating unit 106 assigns the value of the time-domain compensation signal $s_c$ as zero. Consequently, the time-domain compensation signal $s_c$ is an evaluation of the distorted portion of the time-domain signal r caused by the noise blanker 10. The operation of the compensation estimating unit 106 is represented by the following equation:

$$s_c[i] = \begin{cases} s_{err}[i], & \text{if } |s_{err}[i]| > V_{TH2} \\ 0, & \text{otherwise} \end{cases}, i=1,2,\ldots,N \quad \text{Equation (3)}$$

The Fourier transform unit 108 performs a Fourier transform on the time-domain compensation signal $s_c$ to generate a preliminary frequency-domain compensation signal $S_c$. Finally, the calibrating unit 110 converts the preliminary frequency-domain compensation signal $S_c$ according to the channel estimation values $H_e$ to generate a frequency-domain compensation signal. The calibrating unit 110 further compensates the equalized signal $S_{eq}$ according to the frequency-domain compensation signal to generate the output signal $S_{out}$ as the decision-aided reconstruction signal. The operation of the calibrating unit 110 is represented by the following equation:

$$S_{out}[m] = S_{eq}[m] - \frac{S_c[m]}{H_e[m]}, m=1,2,\ldots,N \quad \text{Equation (4)}$$

In addition, the value of the equalized signal $S_{eq}$ is updated by the value of the output signal $S_{out}$, and then return to Equation (2) to reconstruct again the decision-aided reconstruction signal. To obtain a better performance of the impulse suppression, the updating of equalized signal $S_{eq}$ and generating of the decision-aided reconstruction signal could be repeated for several times.

It should be note that a lot of operation shown in the above equations utilizes the channel estimation values $H_e$. As a result, the good quality of the channel estimation values $H_e$ is required. According to the claimed invention, the decision-aided reconstruction signal has less influence of impulse noise, and could be used for better estimation of the channel effect to improve the quality of the channel estimation values $H_e$. The operation of updating the channel estimation values $H_e$ is represent by the following equation:

$$\frac{S_{out}[m] \cdot H_e[m]}{S_d[m]} \rightarrow H_e[m] \quad \text{Equation (5)}$$

In the Equation (5) m denotes the index of the pilot channel, and $S_d[m]$ is the pilot symbol transmitted through the pilot channel. The channel estimation values $H_e$ are repeatedly updated by executing the Equation (5) as the generation of the decision-aided reconstruction signal is repeated for several times. Please note that the operation of updating the channel estimation values $H_e$ is not limited to the present embodiment. Other method capable of increasing the accuracy of the decision signal $S_d$ can be utilized to update the equalized signal $S_{eq}$ then the channel estimation values $H_e$ is adjusted according to the updated equalized signal $S_{eq}$ and the Equation (5).

Figure 4:
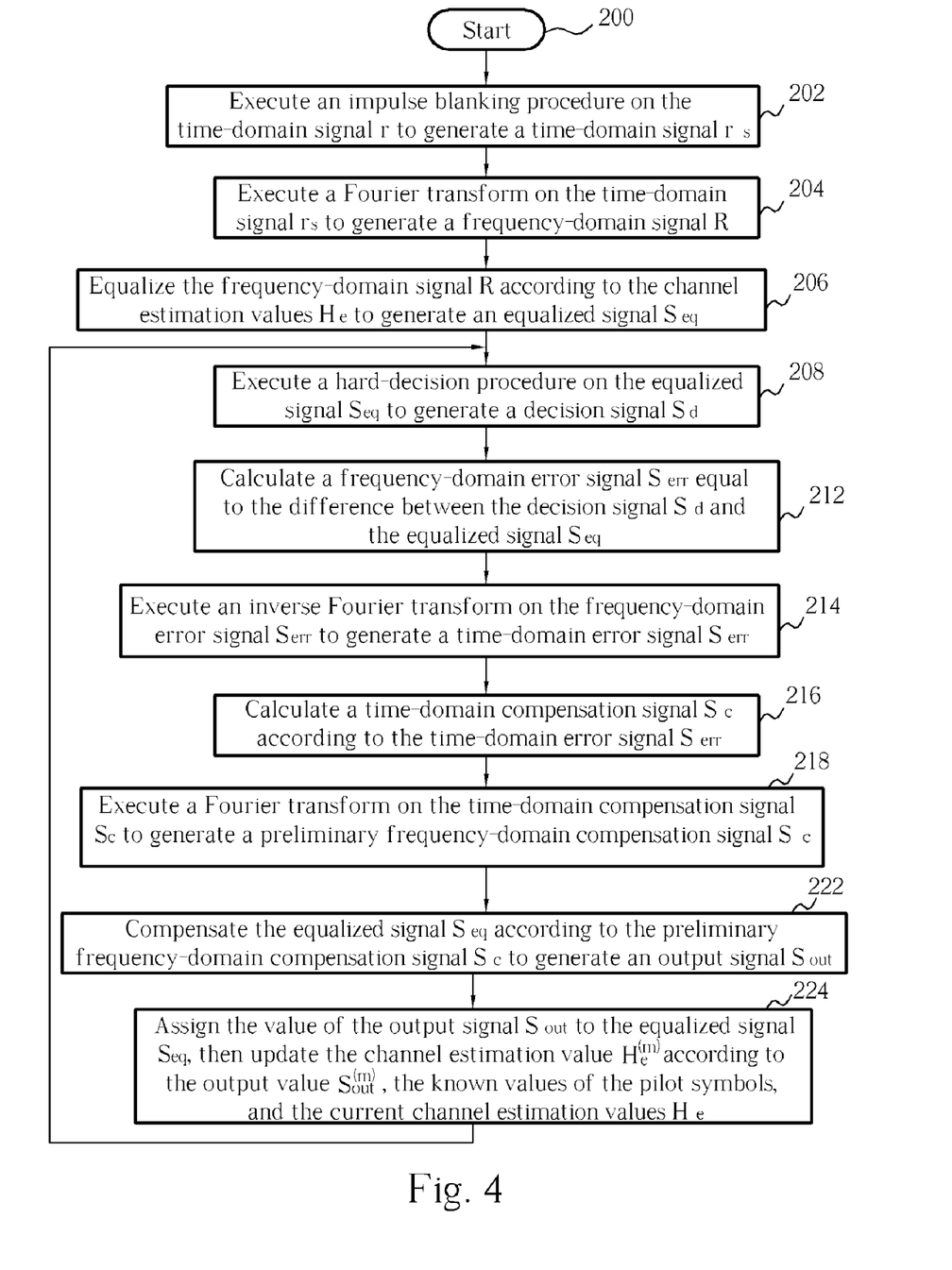
FIG. 4 is the flow chart of the operation of the impulse suppression apparatus for adjusting the channel estimation value then generating the output signal.

Please refer to FIG. 4. FIG. 4 is the flow chart of the operation of the impulse suppression apparatus 100 for improving the quality of channel estimation value $H_e$ and for generating the output signal $S_c$. The operation of the impulse suppression apparatus 100 comprises steps:

Step 200: Start.

Step 202: Perform an impulse blanking procedure on the time-domain signal r to generate a time-domain signal $r_s$.

Step 204: Perform a Fourier transform on the time-domain signal $r_s$ to generate a frequency-domain signal R.

Step 206: Equalize the frequency-domain signal R according to the channel estimation values $H_e$ to generate an equalized signal $S_{eq}$.

Step 208: Perform a hard-decision on the equalized signal $S_{eq}$ to generate a decision signal $S_d$.

Step 212: Estimate a frequency-domain error signal $S_{err}$ equal to the difference between the decision signal $S_d$ and the equalized signal $S_{eq}$.

Step 214: Perform an inverse Fourier transform on the frequency-domain error signal $S_{err}$ to generate a time-domain error signal $s_{err}$.

Step 216: Evaluate a time-domain compensation signal $s_c$ according to the time-domain error signal $s_{err}$.

Step 218: Perform a Fourier transform on the time-domain compensation signal $s_c$ to generate a preliminary frequency-domain compensation signal $S_c$.

Step 222: Compensate the equalized signal $S_{eq}$ according to the preliminary frequency-domain compensation signal $S_c$ to generate an output signal $S_{out}$.

Step 224: Assign the value of the output signal $S_{out}$ to the equalized signal $S_{eq}$, then update the channel estimation value $H_e[m]$ of the pilot channels according to the output value $$S_{out}^{(m)}$$

$S_{out}[m]$ of output signal $S_{out}$ corresponding to the pilot channels, the known values of the pilot symbols transmitted through the pilot channels, and the current channel estimation values $H_e$ corresponding to the pilot channels.

Beside generating a precise output signal $S_{out}$ through utilizing the decision-aided procedure, the embodiment further discloses a method capable of improving the performance of the impulse suppression in step 224. If the steps 208~222 can be executed for several times and the channel estimation values $H_e$ is updated accordingly, the performance of the impulse suppression is improved significantly.

Compared with the related art, according to the present invention, the impulse suppression apparatus and the related method utilize a compensation module to evaluate a frequency-domain compensation signal. Next, the equalized signal is compensated according to the frequency-domain compensation signal to generate a decision-aided reconstruction signal. In addition, the channel estimation values of the OFDM system are adjusted gradually. As a result, the signal quality of the OFDM increases according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An impulse noise suppression apparatus applied in an Orthogonal Frequency Division Multiplexing (OFDM) communication system for suppressing an impulse noise in a first time-domain signal to generate an output signal, the impulse suppression apparatus comprising:
    a noise blanker for processing the first time-domain signal to generate a second time-domain signal, wherein if an absolute value of the first time-domain signal corresponding to a time instant is greater than a first threshold value, the second time-domain signal corresponding to the time instant is generated to have an absolute value not greater than a predetermined value; and if the absolute value of the first time-domain signal corresponding to the time instant is not greater than the first threshold value, the second time-domain signal corresponding to the time instant is generated according to the value of the first time-domain signal corresponding to the time instant;
    a first Fourier transform unit, coupled to the noise blanker, for performing a Fourier transform on the second time-domain signal to generate a frequency-domain signal, wherein the frequency-domain signal is composed of a plurality of sub-carrier signals and each sub-carrier signal corresponds to one of a plurality of sub-carriers;
    an equalizing module, coupled to the first Fourier transform unit, for generating an equalized signal by equalizing the frequency-domain signal according to a plurality of channel estimation values respectively corresponding to the plurality of sub-carriers, wherein the equalized signal is composed of a plurality of equalized values, and each equalized value corresponds to one of the plurality of sub-carriers;
    a decision unit, coupled to the equalizing module, for generating a decision signal according to the equalized signal, wherein the decision signal is composed of a plurality of decision values and each decision value corresponds to one of the plurality of sub-carriers; and
    a compensation module, coupled to the equalizing module and the decision unit, for estimating a time-domain compensation signal corresponding to the difference between the equalized signal and the decision signal, and for generating the output signal by calibrating the equalized signal according to the time-domain compensation signal, wherein the output signal is composed of a plurality of output values and each output value corresponds to one of the plurality of sub-carriers.

2. The impulse suppression apparatus of claim 1, wherein the decision unit generates a decision value corresponding to one of the plurality of sub-carriers in a hard decision scheme.

3. The impulse suppression apparatus of claim 1, wherein the decision unit generates a decision value corresponding to one of the plurality of sub-carriers according to a known value.

4. The impulse suppression apparatus of claim 1, wherein the compensation module comprises:
    an error estimating module, coupled to the equalizing module and the decision unit, for computing a difference between the equalized signal and the decision signal, and for estimating a frequency-domain error signal by adjusting the difference according to the channel estimation values;
    an inverse Fourier transform unit, coupled to the error estimating module, for performing inverse Fourier transform on the frequency-domain error signal to generate a time-domain error signal;
    a compensation evaluating unit, coupled to the inverse Fourier transform unit, for evaluating a time-domain compensation signal according to the time-domain error signal;
    a second Fourier transform unit, coupled to the compensation evaluating unit, for performing a Fourier transform on the time-domain compensation signal to generate a preliminary frequency-domain compensation signal; and
    a calibrating unit, coupled to the equalizing module, a channel estimating unit, and the second Fourier transform unit, for generating the frequency-domain compensation signal by adjusting the preliminary frequency-domain compensation signal according to the channel estimation values, and for generating the output signal by calibrating the equalized signal according to the frequency-domain compensation signal.

5. The impulse suppression apparatus of claim 4, wherein the compensation evaluating unit compares the time-domain error signal with a second threshold value, if the absolute value of the time-domain error signal corresponding to a time instant is greater than the second threshold value, then sets the value of the time-domain compensation signal corresponding to the time instant according to the value of the time-domain error signal corresponding to the time instant, and if the absolute value of the time-domain error signal corresponding to the time instant is not greater than the second threshold value, then sets the value of the time-domain compensation signal corresponding to the time instant to be zero.

6. The impulse suppression apparatus of claim 4, wherein the calibrating unit generates the output signal by subtracting the frequency-domain compensation signal from the equalized signal.

7. The impulse suppression apparatus of claim 1, wherein the equalizing module comprising:
   a channel estimating unit, for evaluating the channel estimation values; and
   an equalizing unit, coupled to the channel estimating unit, for generating the equalized signal by equalizing the frequency-domain signal according to the channel estimation values.

8. The impulse suppression apparatus of claim 7, wherein the channel estimating unit is further coupled to the compensation module and the decision unit, and the channel estimating unit updates the channel estimation values according to the output signal generated by the compensation module, the decision signal generated by the decision unit, and present channel estimation values.

9. The impulse suppression apparatus of claim 8, wherein the channel estimating unit updates the channel estimation value corresponding to one of the plurality of sub-carriers by multiplying the output value corresponding to the sub-carrier with the present channel estimation value corresponding to the sub-carrier to have a multiplied result and dividing the multiplied result by the decision value corresponding to the sub-carrier.

10. The impulse suppression apparatus of claim 1, being applied in a Digital Television (DTV) system.

11. The impulse suppression apparatus of claim 1, wherein the predetermined value is zero.

12. An impulse noise suppression method applied in an Orthogonal Frequency Division Multiplexing (OFDM) communication system for suppressing an impulse noise in a first time-domain signal to generate an output signal, the impulse suppression method comprising:
   (a) if an absolute value of the first time-domain signal corresponding to a time instant is greater than a first threshold value, generating a second time-domain signal corresponding to the time instant to have an absolute value not greater than a predetermined value; and if the absolute value of the first time-domain signal corresponding to the time instant is not greater than the first threshold value, generating the second time-domain signal corresponding to the time instant according to the value of the first time-domain signal corresponding to the time instant;
   (b) performing a Fourier transform on the second time-domain signal to generate a frequency-domain signal, wherein the frequency-domain signal is composed of a plurality of sub-carrier signals, and each sub-carrier signal corresponds to one of a plurality of sub-carriers;
   (c) generating an equalized signal by equalizing the frequency-domain signal according to a plurality of channel estimation values corresponding to the plurality of sub-carriers, wherein the equalized signal is composed of a plurality of equalized values, and each equalized value corresponds to one of the plurality of sub-carriers;
   (d) generating a decision signal according to the equalized signal, wherein the decision signal is composed of a plurality of decision values and each decision value corresponds to one of the plurality of sub-carriers; and
   (e) estimating a time-domain compensation signal corresponding to a difference between the equalized signal and the decision signal, and generating the output signal by calibrating the equalized signal according to the time-domain compensation signal, wherein the output signal is composed of a plurality of output values and each output value corresponds to one of the plurality of sub-carriers.

13. The impulse suppression method of claim 12, wherein the step (d) comprises:
   generating a decision value corresponding to one of the plurality of sub-carriers in a hard decision scheme.

14. The impulse suppression method of claim 12, wherein the step (d) comprises:
   generating a decision value corresponding to one of the plurality of sub-carriers according to a known value.

15. The impulse suppression method of claim 12, wherein the step (e) comprises:
   (f) estimating a frequency-domain error signal according to the difference between the equalized signal and the decision signal and the channel estimation values;
   (g) performing an inverse Fourier transform on the frequency-domain error signal to generate a time-domain error signal;
   (h) evaluating a time-domain compensation signal according to the time-domain error signal;
   (i) performing a Fourier transform on the time-domain compensation signal to generate a preliminary frequency-domain compensation signal;
   (j) generating the frequency-domain compensation signal by adjusting the preliminary frequency-domain compensation signal according to the channel estimation values; and
   (k) calibrating the equalized signal according to the frequency-domain compensation Signal to generate the output signal.

16. The impulse suppression method of claim 15, wherein the step (h) comprises:
   comparing the time-domain error signal with a second threshold value;
   if an absolute value of the time-domain error signal corresponding to a time instant is greater than the second threshold value, setting the value of the time-domain compensation signal corresponding to the time instant according to the value of the time-domain error signal corresponding to the time instant; and
   if the absolute value of the time-domain error signal corresponding to the time instant is not greater than the second threshold value, setting the value of the time-domain compensation signal corresponding to the time instant to be zero.

17. The impulse suppression method of claim 15, wherein the step (k) comprises:
   subtracting the frequency-domain compensation signal from the equalized signal to generate the output signal.

18. The impulse suppression method of claim 12, wherein the step (c) comprises:

(l) evaluating the channel estimation values; and (m) equalizing the frequency-domain signal according to the channel estimation values to generate the equalized signal.

19. The impulse suppression method of claim 18, wherein after the step (e) being executed, step (l) calculates to update the channel estimation values according to the output signal generated by step (e), decision signal generated by step (d), and present channel estimation values.

20. The impulse suppression method of claim 19, wherein the step (l) comprises:

calculating by multiplying the output value corresponding to one of the plurality of sub-carriers with the channel estimation value corresponding to the sub-carrier to have a multiplied result and dividing the multiplied result by the decision value corresponding to the sub-carrier to update the channel estimation value corresponding to the sub-carrier.

21. The impulse suppression method of claim 12, being applied in a Digital Television (DTV) system.

22. The impulse suppression method of claim 12, wherein the predetermined value is zero.

\* \* \* \* \*